T. W. PORTER.
Wheels for Vehicles.

No. 143,029. Patented September 23, 1873.

WITNESSES
Herbert T. Whitman
Franklin B. Collamore

INVENTOR.
T. W. Porter

UNITED STATES PATENT OFFICE.

THOMAS W. PORTER, OF BOSTON, MASSACHUSETTS.

IMPROVEMENT IN WHEELS FOR VEHICLES.

Specification forming part of Letters Patent No. 143,029, dated September 23, 1873; application filed June 30, 1873.

*To all whom it may concern:*

Be it known that I, THOMAS W. PORTER, of Boston, in the county of Suffolk and State of Massachusetts, have invented new and useful Improvements in Carriage-Wheels, of which the following is a specification:

This invention relates to wheels used upon carriages of almost every description, except perhaps the heavy class of drays and truck-carts; and the invention consists in a hub formed in two parts, divided by a line passing through the plane of the wheel, the halves being secured together by rivets or bolts passing through bosses between the spokes, the shell of the hub being formed of metal and filled with wood inserted from the interior opening, while flanged wings or plates seated in recesses in the interior faces of the halves of the hub shell serve as a seat or shoulder for the end of the spoke to rest upon, and also in part as lateral bearings for the spokes. This invention also consists in securing or connecting the spokes with the rim by means of metallic couplings formed with a socket for the reception of the spoke, a collar, either cast upon the coupling or attached by a screw-thread, so as to be adjustable, and which serves as the shoulder or seat for the felly, and a hollow projection or tube, which is inserted through the felly, and serves as the pin or tenon of the spoke.

Figure 1:
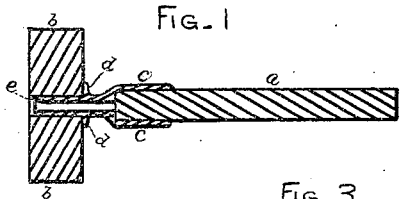
Figure 2:
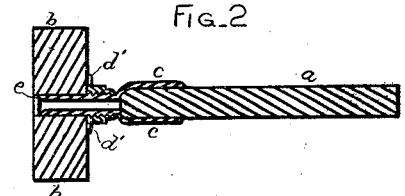
Figures 3, 4:
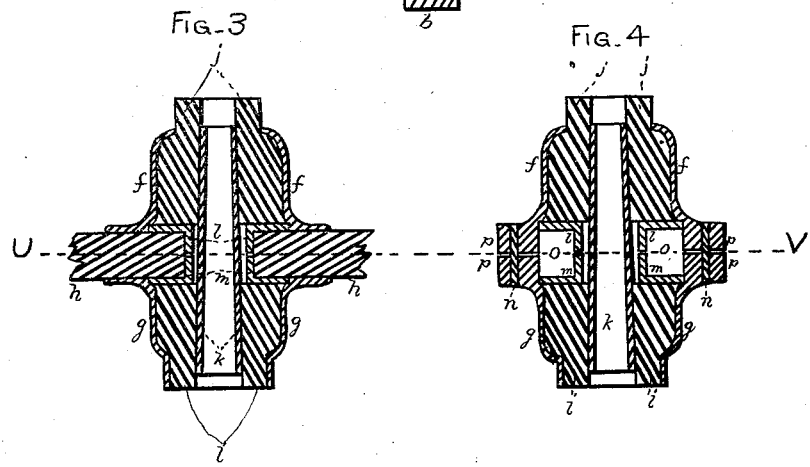
Figure 5:
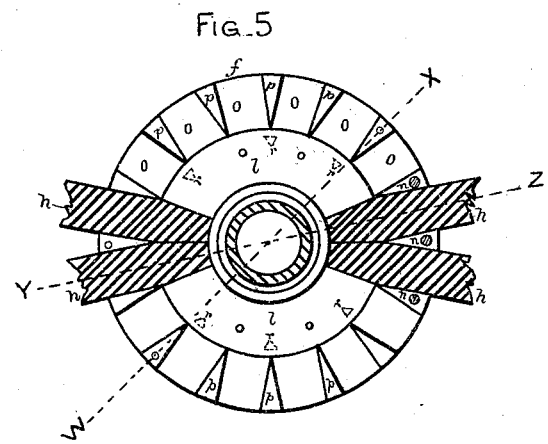

Figure 1 is a section taken longitudinally through the spoke and in the plane of the wheel, showing the coupling formed with a rigid collar. Fig. 2 is a similar section, but showing the coupling formed with an adjustable collar or shoulder for the felly. Fig. 3 is a section taken longitudinally through the hub, and showing the spokes inserted, this section being taken on line Y Z, Fig. 5. Fig. 4 is a similar section, but taken on the line W X, Fig. 5, with the spokes omitted. Fig. 5 is a section taken transversely through the hub on line U V, Figs. 3 and 4, and showing a part of the spokes inserted.

In the drawings, $a$ represents the spokes, and $b$ the felly. $c$ is a cylindrical socket, in which the spoke is inserted. $d$ is a collar or annular flange cast upon the coupling at the neck, and $e$ is a tube extending through the felly. The bore of this tube extends into socket $e$, as shown.

In Fig. 3 the same arrangement of parts is shown, except that instead of rigid collar $d$ a screw-collar, $d'$, is shown. This collar is threaded like a screw-nut and fits upon a male thread cut upon the neck of the coupling, and by turning it outward the wheel may be expanded and the tire tightened. The tube extends through the felly, as in Fig. 1, and the bore of this tube extends through to socket $c$, as shown.

Metallic couplings, formed with sockets to receive the spokes, shoulders for the fellies, and a pin to pass through the felly, are not I believe new; but, as I intend to claim, the novelty of this part of my invention consists in forming the coupling not only as just above stated, but with a bore or passage throughout its entire length with an adjustable shoulder, by which it is not only rendered lighter but stronger in proportion to its weight.

Figs. 3, 4, and 5, $f f$ represent the shell or outer wall of the front half of the hub, and $g$ $g$ the shell of the inner half. These two halves are nearly alike, differing only in proportions or form of outline, and the statements applicable to one relate equally to the other. $i$ is the cylinder of wood inserted in the inner half, and $j$ that inserted in the outer half.

The principal object of inserting these cylinders of wood is to furnish a bearing for the axle-box $k$, which may be of any desired pattern, this hub furnishing the same facilities for "boxing" as the common wood hub. $l\ l$ is the circular flanged plate, which is inserted in the recess or shoulder in the outer half of the hub, and $m\ m$ is a similar plate inserted in the inner half. The hole through these plates, which is surrounded by the flanges, is larger than the axle-box, so that the same shall pass freely through. $o$, in Figs. 4 and 5, is the mortises or spaces for the spokes $h$. $p$ represents the bosses between the spokes or mortises, which project from the inner faces of the halves of the hub, and through which the rivets $n\ n$ pass, securing the halves together.

If desired, instead of forming these bosses upon both halves they may be formed only upon one, and of such increased length as to afford the required room for the spoke.

In Figs. 3 and 5 the ends of the spokes are shown in contact with the flanges formed upon plates *l m*, which serve as a shoulder or support for the spokes. The plates *l m* may be, for convenience, nailed or screwed to the wood, as shown in Fig. 5, while the wheel is being constructed. The dotted lines *r r* represent internal longitudinal ribs or teeth cast upon the shell of the hub, and which entering the wood prevent rotation of the same relatively to the shell. These teeth are arranged near the ends of the hub, so that wedging the box shall also force the wood against them.

In Figs. 3 and 4 the wood is shown projecting beyond the shell of the hub, so as to receive a band of any desired style; but the shell of the hub may be formed to serve the purpose of a projecting band, when so deemed desirable.

By this construction of a hub all parts of the metal may be as thin as desired, without resorting to the process of "coring," and the entire exposed surface is formed of metal and exempt from decay, bruises, or injury from exposure to moisture or shrinkage, and without objectionable weight the most symmetrical form available.

I claim as my invention—

1. A metallic spoke and felly coupling formed tubular through its whole length and provided with the adjustable screw-shoulder *d'*, substantially as described and shown.

2. The insertible flanged plates *l m*, in combination with the outer shell, substantially as described and shown.

3. A hub divided transversely and having two metallic parts, *f g*, with the bosses *p*, so formed upon one or both parts as to separate the spokes at the outer periphery of the hub, and having entire metallic spoke-sockets, and the parts *f g* being united by rivets passing through the bosses, substantially as described and shown.

4. A transversely-divided hub, the metallic portions of which constitute the entire outer wall or surface thereof, and have transversely-divided wood filling and the bosses *p* formed upon one or both of the said halves, substantially as described and shown.

THOMAS W. PORTER.

Witnesses:
MARY R. LANE,
EBEN HUTCHINSON.